United States Patent
Malhotra et al.

[11] Patent Number: 6,146,737
[45] Date of Patent: Nov. 14, 2000

[54] MAGNETIC RECORDING MEDIUM HAVING A NITROGEN-CONTAINING BARRIER LAYER

[75] Inventors: Sudhir S. Malhotra, Fremont; Brij Bihari Lal; James L. Chao, both of Milpitas; Michael A. Russak, Pleasanton, all of Calif.

[73] Assignee: HMT Technology Corporation, Fremont, Calif.

[21] Appl. No.: 09/156,950

[22] Filed: Sep. 18, 1998

[51] Int. Cl.$^7$ .................................................. G11B 5/66
[52] U.S. Cl. ........................ 428/65.3; 428/65.5; 428/65.7; 428/694 T; 428/694 TS; 428/694 TP; 428/336; 428/900; 204/192.2
[58] Field of Search .................................. 428/65.3, 65.5, 428/65.7, 694 T, 694 TS, 694 TP, 900, 336; 204/192.2

[56] References Cited

U.S. PATENT DOCUMENTS

| | | | |
|---|---|---|---|
| 4,152,487 | 5/1979 | Yanagisawa | 428/621 |
| 4,154,875 | 5/1979 | Yanagisawa et al. | 427/130 |
| 4,631,202 | 12/1986 | Opfer | 427/131 |
| 4,789,598 | 12/1988 | Howard et al. | 428/408 |
| 4,929,514 | 5/1990 | Natarajan et al. | 428/611 |
| 5,344,706 | 9/1994 | Lambeth et al. | 428/336 |
| 5,672,425 | 9/1997 | Sato et al. | 428/332 |
| 5,679,431 | 10/1997 | Chen | 428/65.3 |

FOREIGN PATENT DOCUMENTS

0 145 157  2/1989  European Pat. Off. .

*Primary Examiner*—Leszek Kiliman
*Attorney, Agent, or Firm*—Judy M. Mohr; Iota Pi Law Group

[57] ABSTRACT

A magnetic recording medium having a barrier layer deposited directly on the magnetic recording layer is described. The barrier layer is deposited by sputter deposition under a nitrogen-containing sputtering atmosphere to form a nitrogen-containing chromium or chromium alloy barrier layer. The barrier layer is effective to inhibit migration of cobalt from the underlying magnetic recording layer, reducing corrosion of the medium and improving magnetic recording performance.

18 Claims, 6 Drawing Sheets

MAGNETIC RECORDING MEDIUM HAVING A NITROGEN-CONTAINING BARRIER LAYER

FIELD OF THE INVENTION

The present invention relates to an improved magnetic recording disc for use in magnetic recording devices, such as a computer disc drive.

BACKGROUND OF THE INVENTION

Thin-film magnetic discs or media are widely used as data storage media for digital computers. The discs are typically formed by successively sputtering onto a rigid disc substrate and underlayer, a magnetic recording layer and a carbon overcoat which protects the magnetic layer from wear and reduces the frictional forces between the disc and the read∴write head.

In addition to having excellent magnetic recording properties, for example, a high coercivity and low noise, it is highly desirable for the magnetic recording discs to be stable against oxidation of the magnetic layer. It is a recognized problem in the art that the surface of magnetic media are susceptible to moist atmospheric corrosion and that such corrosion to the surface causes a reduction in magnetic properties of the medium.

One approach for improving the stability of the magnetic medium has been to include chromium as a component in the alloy forming the magnetic recording layer, since chromium is known to offer corrosion resistance (Howard, U.S. Pat. No. 4,789,598; Natarajan U.S. Pat. No. 4,929,514).

Another approach to protecting the magnetic layer from wear and/or contamination, e.g., oxidation, has been to provide special layers or coatings over the magnetic layer. For example, Opfer (U.S. Pat. No. 4,631,202; EP 145157) describes a magnetic recording medium having a barrier layer disposed on a CoPt magnetic recording layer, the barrier layer having a thickness of between 100–600 Å. Yanagisawa (U.S. Pat. Nos. 4,152,487 and 4,154,875) describes a magnetic medium having a 100–300 Å protective layer made of a polysilicate and formed on the magnetic layer.

Such protective layers are also known in the field of tape-based magnetic media, where corrosion-resistant protective films deposited on the magnetic layer to prevent penetration of moisture and thus corrosion of the magnetic layer have been described. For example, Sato (U.S. Pat. No. 5,672,425) describes a protective layer selected from a group of metals and having a thickness of greater than 30 Å.

One problem with the protective layers disclosed in the art is that the layer must be relatively thick to provide the desired protective properties. The disadvantage to a thick protective layer is the accompanying increase in distance between the magnetic layer and the transducer head, e.g., the flying height, which leads to increased spacing loss and limits the recording density of the disc and diminishes other recording properties, such as the signal amplitude.

SUMMARY OF THE INVENTION

Accordingly, it is an object of the invention to provide a magnetic recording disc having an improved barrier layer for protection of the magnetic recording layer from corrosion.

In one aspect, the invention includes a magnetic recording medium, comprising a nonmagnetic, rigid disc substrate, an underlayer formed on the substrate, a magnetic recording layer formed on the underlayer, and a barrier layer deposited by sputter deposition in a nitrogen-containing atmosphere. The barrier layer is composed of chromium or a chromium-based alloy and has a thickness of between 10–50 Å.

In one embodiment, the barrier layer has a thickness of between 15–40 Å.

In another embodiment, the barrier layer is sputtered in an atmosphere containing between 5–50% nitrogen, balance argon. In yet another embodiment, the barrier layer is neat chromium and in another embodiment, the barrier layer is a chromium-based alloy, e.g., an alloy containing at least 50 atomic percent chromium.

The underlayer, in still another embodiment, is composed of chromium or a chromium-based alloy. Alternatively, the underlayer is composed of a first underlayer and a second underlayer, the first underlayer composed of chromium and the second underlayer composed of a chromium-based alloy. The chromium-based alloy can be, for example, CrRu or CrMo.

The magnetic layer is composed of a cobalt-based alloy, and in a preferred embodiment, contains cobalt, chromium, platinum and tantalum.

In another embodiment, the medium includes a protective overcoat.

In another aspect, the invention includes an improvement in a magnetic recording medium formed on a rigid disc substrate and having an underlayer, a magnetic recording layer and a barrier layer deposited directly on the magnetic recording layer. The improvement includes a nitrogen-containing barrier layer composed of chromium or a chromium-based alloy and having a thickness of between 10–50 Å.

In still another aspect, the invention includes a method of preparing a magnetic recording medium formed on a substrate and having an underlayer and a magnetic recording layer. The method includes depositing by sputter deposition in a nitrogen-containing sputtering atmosphere, a barrier layer directly on the magnetic recording layer, said layer being composed of chromium and having a thickness of between 10–50 Å.

In one embodiment of this aspect, the barrier layer is deposited by sputtering in an atmosphere containing between 5–50% nitrogen, balance argon.

These and other objects and features of the invention will be more fully appreciated when the following detailed description of the invention is read in conjunction with the accompanying drawings.

DETAILED DESCRIPTION OF THE INVENTION

I. Magnetic Recording Medium

Figure 1A:
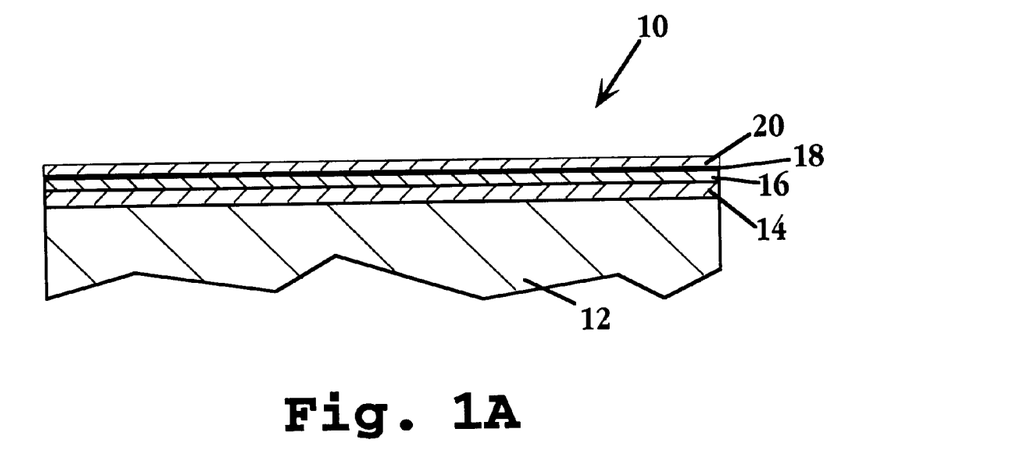
FIG. 1A is a sectional view of a thin-film magnetic disc in accordance with one embodiment of the present invention.

FIG. 1A shows in cross sectional view, a fragmentary portion of a thin-film medium or disc 10 formed in accordance with one embodiment of the invention. The disc generally includes a rigid substrate 12, and forming successive thin-film layers over the substrate, a crystalline underlayer 14, a magnetic thin-film layer 16, a barrier layer 18 and a protective overcoat layer 20. It will be appreciated that the disc is symmetrical with respect to its upper and lower surfaces, the lower portion of the disc not being shown in the figure.

The substrate can be either a metallic or non-metallic substrate, such as a conventional surface-coated, aluminum substrate of the type used commonly for digital recording medium. Suitable non-metallic materials for the substrate include glass, ceramic, glass-ceramic, carbon, silicon nitride, silicon carbide or a heat-resistant polymer. Conventional substrates are typically 130 mm or 95 mm in outer diameter (5.1 inches and 3.74 inches respectively), with corresponding inner diameters of 40 mm and 25 mm (1.57 inches and 0.98 inches), respectively.

The substrate is generally textured by any of the methods known in the art to achieve suitable friction during contact-start-stop with the recording head, yet is sufficiently smooth for acceptable flying head height.

Underlayer 14, in one embodiment of the invention, consists of a single layer composed of chromium or an alloy of chromium (Cr), e.g., a chromium-based alloy, which refers to an alloy containing at least 50 atomic percent chromium. The alloy can be binary or ternary, and exemplary binary alloys include CrRu, CrTi, CrV, CrSi, CrGd and CrMo. Typically the amount of the second component in the chromium-based alloy is between 5–50 atomic percent. Exemplary ternary alloys include CrRuMo, CrVW, CrRuV and CrRuB. The underlayer is deposited to a desired thickness of typically between 200–3,000 Å by techniques known in the art, such as varying the sputtering time and/or rate.

Figure 1B:
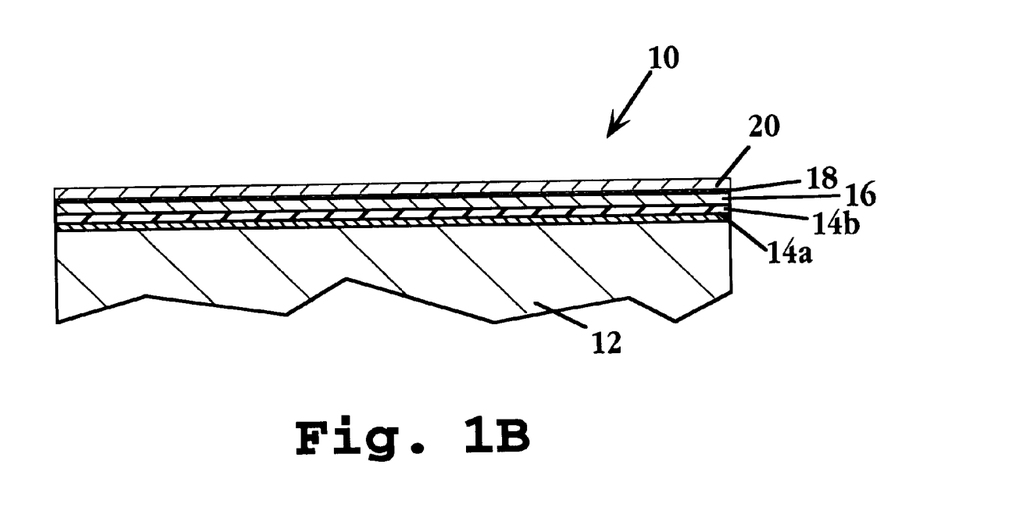
FIG. 1B is a sectional view of a thin-film magnetic disc in accordance with another embodiment of the present invention.

In another embodiment of the invention, as shown in FIG. 1B, the underlayer consists of a first underlayer 14a and a second underlayer 14b. Like layers are numbered identically in FIGS. 1A and 1B. The first and second underlayers in the medium shown in FIG. 1B can be of chromium or of any of the chromium-based alloys listed above. In a preferred embodiment, first underlayer 14a is composed of chromium and second underlayer 14b is composed of a chromium-based alloy. As will be described below, in studies performed in support of the invention, media having a two-layer underlayer were prepared, where the first underlayer was composed of chromium and the second underlayer was composed of either CrMo (80/20) or CrRu (90/10). The first and second underlayers each have a thickness of between 100–2,000 Å.

Magnetic layer 16 is preferably a cobalt-based alloy which is formed on the underlayer by sputtering or the like to a desired thickness, preferably between 100–800 Å. A "cobalt-based" alloy refers to an alloy containing at least 50 atomic percent cobalt. Exemplary binary cobalt-based alloys include Co/Cr or Co/Ni, and exemplary ternary, quaternary, and five-element alloys include Co/Cr/Ta, Co/Ni/Pt, Co/Ni/Cr, Co/Cr/Ta/Pt, Co/Ni/Cr/Pt, and Co/Cr/Ni/Pt/B. A preferred cobalt-based alloy is composed of 80–90% cobalt, 5–20% chromium and 2–10% tantalum. Another preferred cobalt-based alloy is composed of 70–90% cobalt, 5–20% chromium, 2–10% tantalum and 1–8% platinum.

Barrier layer 18 is deposited directly on the magnetic recording layer to a thickness of between 10–50 Å, more preferably between 15–40 Å. The barrier layer is composed of neat chromium or of a chromium-based alloy; that is an alloy containing at least 50 atomic percent chromium, for example, CrRu, CrTi, CrMo, CrRuMo, CrRuW. As will be described below, and in accordance with another important feature of the invention, the chromium barrier layer contains nitrogen by virtue of its being deposited by sputter deposition from a sputtering target under an atmosphere containing nitrogen.

In the studies described below, magnetic recording media having a double underlayer structure, a first underlayer of chromium and a second underlayer of CrMo or CrRu, a magnetic recording layer composed of cobalt, chromium, tantalum and platinum and a nitrogen-containing chromium barrier layer were prepared.

Overcoat 20 in FIGS. 1A–1B is formed by sputter deposition onto the magnetic recording layer. The overcoat may be composed of carbon, silicon oxide, silicon nitride, or other suitable material giving wear-resistant, protective properties to the medium. Preferably, the overcoat is formed of carbon and has a thickness between 80–250 Å.

II. Method of Prepariinq the Medium

The magnetic recording medium of the invention is prepared in conventional sputtering systems, such as those available from Intevac (Santa Clara, Calif.), Circuits Processing Apparatus (Fremont, Calif.), ULVAC (Japan), Leybald Heraeus (Germany), VACTEC (Boulder, Colo.), or ANELVA (Japan). These systems are double-sided, in-line, high-throughput machines having two interlocking systems, for loading and unloading. It will be appreciated that DC, RF and DC/RF systems, conventional or magnetron, are suitable.

The sputtering systems include a series of sputtering stations or chambers for deposition of the layers comprising the medium. Prior to entering the first sputtering station for deposition of the underlayer, the disc substrate is heated in a heating stations which has a plurality of infrared lights which are arrayed for heating both sides of the substrate or substrates. Typically, the substrate is heated to a substrate temperature of between about 220° C. and 270° C., and preferably about 250° C.

Just downstream of the heating station is a first sputtering station at which the underlayer is formed on the substrate, in a manner to be described. The station includes a pair of targets effective to sputter chromium or a chromium-based alloy onto opposite sides of the substrate or substrates in the chamber. In the embodiment where the medium includes a first underlayer and a second underlayer, each of the underlayers is deposited in a separate sputtering station equipped with the appropriate sputtering targets.

Another sputtering station is designed for sputtering the magnetic recording layer onto the underlayer. The station includes a pair of sputtering targets for sputtering the magnetic film alloy onto the underlayer-coated substrate. The targets in this station are formed of a Co-based alloy in one of the exemplary compositions given above. The alloy is formed and shaped for use as a sputtering target by conventional metallurgical methods.

Figure 2:
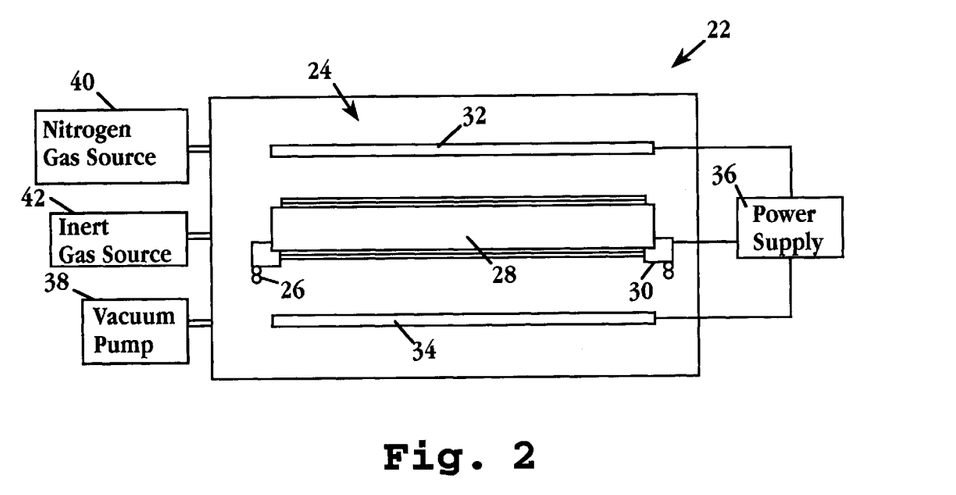
FIG. 2 is a schematic illustration of a portion of a sputtering apparatus used in forming the medium of the invention.

In the next station in the apparatus, the chromium barrier layer is deposited on the magnetic recording layer. FIG. 2 shows, in schematic cross-sectional view, a sputtering station 22. Station 22 includes a vacuum chamber 24 and within this chamber is a pair of endless belts, such as belt 26, for carrying substrates, such as substrate 28, through the chamber. The substrates are supported on pallets, such as pallet 30, which is carried through the chamber on the endless belts.

Station 22 houses a pair of targets i.e., chromium targets 32, 34. The targets are connected to a power supply 36 in the apparatus to achieve a selected target voltage with respect to the disc, as shown.

The final pressure in the chamber during a sputtering operation is a selected pressure preferably between about $10^{-3}$ to $10^{-2}$ mTorr. The vacuum pressure is achieved with a conventional low-pressure vacuum pump 38.

As described above, the chromium barrier layer of the invention is deposited by sputtering under a low-pressure, nitrogen-containing atmosphere. The sputtering atmosphere typically contains between 20–40 atomic percent nitrogen gas, i.e., the atoms of $N_2$ introduced into the chamber represent between 5 and 50 atomic percent of the total gas molecules in the chamber. The nitrogen is supplied to the chamber from gas source 40. The balance of gas in the sputtering chamber atmosphere is an inert sputtering gas, such as argon, introduced to the chamber by gas source 42. The desired atomic percentages of gases in the chamber may be controlled by suitable valving apparatus (not shown) which controls the flow rate at which gases are introduced into the chamber. Alternatively, the desired gas may be premixed and admitted to the sputtering chamber from a single mixed-gas source.

In the method of the invention, the chromium barrier layer is deposited in such a chamber having a sputtering atmosphere of 5–50 atomic percent nitrogen, balance argon. The barrier layer is formed under conditions to achieve a final thickness of between 10–50 Å, preferably between 15–40 Å.

According to an important feature of the invention, it has been discovered that a medium having a relatively thin, e.g., 10–50 Å, nitrogen-containing barrier layer is effective to reduce the migration of cobalt from the magnetic layer by about 80%, as determined by inductive coupled plasma and discussed below. The improved stability of the magnetic layer results in improved magnetic recording properties, including an increased high frequency amplitude, resolution and magnetic-remanence thickness product.

After formation of the barrier layer, the disc may be coated with a conventional 25–150 Å overcoat layer of carbon or the like and then coated with a lubricant, such as a perfluoropolyether.

III. Medium Properties

In studies performed in support of the invention, magnetic media were prepared as described above. More specifically, a randomly polished NiP/Al substrate was heated to 250° C. and a first underlayer material of chromium was sputtered deposited to a thickness of 800 Å followed by deposition of a second underlayer, also 800 Å in thickness, of either CrMo (80/20) or CrRu (90/10), as indicated. A magnetic recording layer of CoCrTaPt (74/17/4/5) or CoCrTaPt (77/15/4/5), as indicated, was deposited to a thickness of between 100–500 Å. A nitrogen-containing chromium barrier layer was deposited to a thickness of between 10–50 Å, as indicated. A carbon overcoat was deposited to a thickness of between 25–150 Å, followed by a 10–20 Å layer of a standard lubricant. Comparative media were prepared similarly, except that the chromium barrier layer was deposited in a nitrogen-free sputtering atmosphere to obtain a barrier layer of pure chromium.

Bulk magnetic properties were determined by vibrating sample magnetometry (VSM) conventionally. Magnetic recording testing was carried out on a Guzik Spin-Stand at 5400 rpm at 0.83"ID radius, using a dual element head consisting of a thin inductive head for writing and a magnetoresistive head for read-back and including a spectrum analyzer for noise roll-off. The head flying height was 1.5 pinches, the head gap length was 0.23 nm. The high frequency amplitude was measured at 46.4 MHz. High frequency amplitude and signal-to-noise ratio were measured from 150 kfci to 230 kfci recording density at the inner diameter of the disc.

Table 1 summarizes the magnetic properties of media having a second underlayer of CrMo (80/20) and a magnetic recording layer of CoCrTaPt (74/17/4/5). The first underlayer of Cr and the second CrMo underlayer each were deposited to a thickness of 128 Å. The exemplary media are compared to similar media having a chromium barrier layer which does not contain nitrogen.

TABLE 1

| Cr Barrier | | Magnetic Properties | | |
| --- | --- | --- | --- | --- |
| Layer Thickness Å | Sputtering Atmosphere | Hc (Oe) | Mrt (memu/cm$^2$) | SR | S* |
| 25 | Ar + $N_2$ | 3016 | 0.56 | 0.82 | 0.87 |
| 25 | Ar + $N_2$ | 2990 | 0.59 | 0.85 | 0.88 |
| 25 | Ar + $N_2$ | 3003 | 0.67 | 0.89 | 0.88 |
| 25 | Ar | 2953 | 0.52 | 0.84 | 0.88 |
| 25 | Ar | 2978 | 0.58 | 0.85 | 0.85 |
| 25 | Ar | 2905 | 0.63 | 0.85 | 0.88 |

The three media in Table 1 prepared in accordance with the invention to have a nitrogen-containing barrier layer show an improved magnetic remanence thickness product (Mrt) with not loss, in fact, a slightly improved, coercivity. Improvements in squareness ratio (SR) and in coercivity squareness (S*) are also achieved.

Table 2 compares the parametrics for the media of table 1 having a nitrogen-containing barrier layer to those with a neat chromium barrier layer.

TABLE 2

| Cr Barrier Layer | Sputter-ing | | | Media Parametrics (ID = 0.83"; HF = 46.4 MHZ) | | | | |
| --- | --- | --- | --- | --- | --- | --- | --- | --- |
| Thickness Å | Atmos-phere | Hc (Oe) | Mrt (memu/cm$^2$) | HF ($\mu$V) | LF ($\mu$V) | Res. (%) | OW (dB) | PW$_{50}$ (ns) |
| 25 | Ar + $N_2$ | 3016 | 0.56 | 153 | 725 | 21.2 | 37.9 | 22.25 |
| 25 | Ar + $N_2$ | 2990 | 0.59 | 157 | 767 | 20.5 | 37.5 | 22.53 |
| 25 | Ar + $N_2$ | 3003 | 0.67 | 164 | 791 | 20.7 | 36.7 | 23.11 |
| 25 | Ar | 2953 | 0.52 | 135 | 652 | 20.7 | 38.1 | 22.47 |

TABLE 2-continued

| Cr Barrier Layer Thickness Å | Sputter-ing Atmos-phere | Hc (Oe) | Mrt (memu/ cm²) | Media Parametrics (ID = 0.83"; HF = 46.4 MHZ) | | | | |
|---|---|---|---|---|---|---|---|---|
| | | | | HF (µV) | LF (µV) | Res. (%) | OW (dB) | PW$_{50}$ (ns) |
| 25 | Ar | 2978 | 0.58 | 142 | 702 | 20.3 | 37.2 | 22.99 |
| 25 | Ar | 2905 | 0.63 | 144 | 731 | 19.8 | 36.7 | 23.32 |

As seen, approximately a 12% improvement in the high frequency (HF) signal amplitude and a 10% improvement in the low frequency (LF) signal amplitude are achieved. Accordingly, in one embodiment of the invention, the nitrogen-containing barrier layer is effective to achieve about a 10% improvement in the signal amplitude of the medium. An improvement in pulse width (PW$_{50}$) was also observed, along with no loss in overwrite (OW).

Figure 3:
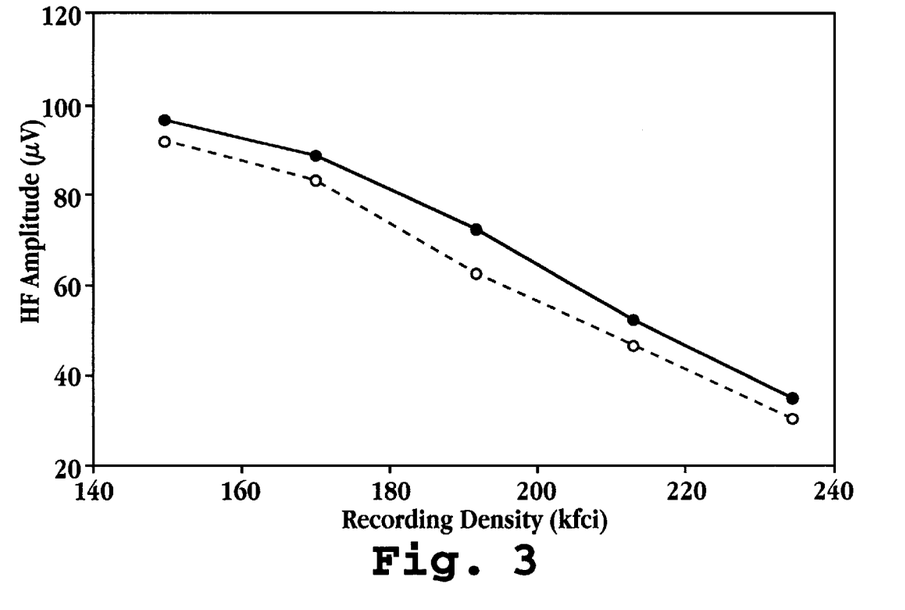
FIG. 3 is a plot of high frequency amplitude, in $\mu V$, against recording density, in kiloflux changes per inch (kfci) for magnetic media having a chromium barrier layer sputtered in an argon-nitrogen atmosphere (closed circles) and in an argon atmosphere (open circles)

FIG. 3 shows the high frequency amplitude as a function of recording density, in kiloflux changes per inch (kfci) for magnetic media described above in Tables 1 and 2. In the figure, the media having a chromium barrier layer sputtered in an argon-nitrogen atmosphere are represented by the closed circles and the comparative media, e.g., media having a chromium barrier layer deposited in substantially pure argon atmosphere are represented by the open circles. Both media had a magnetic-remanence thickness produce of 0.5 memu/cm² and a coercivity of 3,000 Oe. The media having a nitrogen-containing barrier layer have a higher HF-amplitude over the range of recording density tested.

Figure 4:
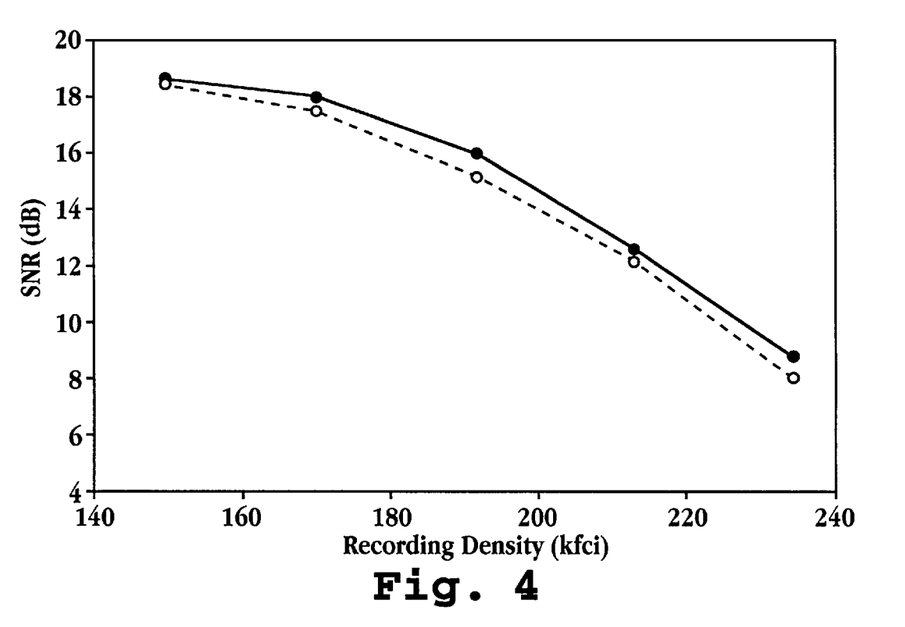
FIG. 4 is a plot of signal-to-noise ratio, in dB, against recording density, in kiloflux changes per inch (kfci) for magnetic media having a chromium barrier layer sputtered in an argon-nitrogen atmosphere (closed circles) and in an argon atmosphere (open circles)

FIG. 4 shows the signal-to-noise ratio, in dB, against recording density, in kiloflux changes per inch (kfci) for media of FIG. 3, where again the magnetic media having a nitrogen-containing chromium barrier layer are represented by the closed circles and the comparative media by the open circles.

Figure 5:
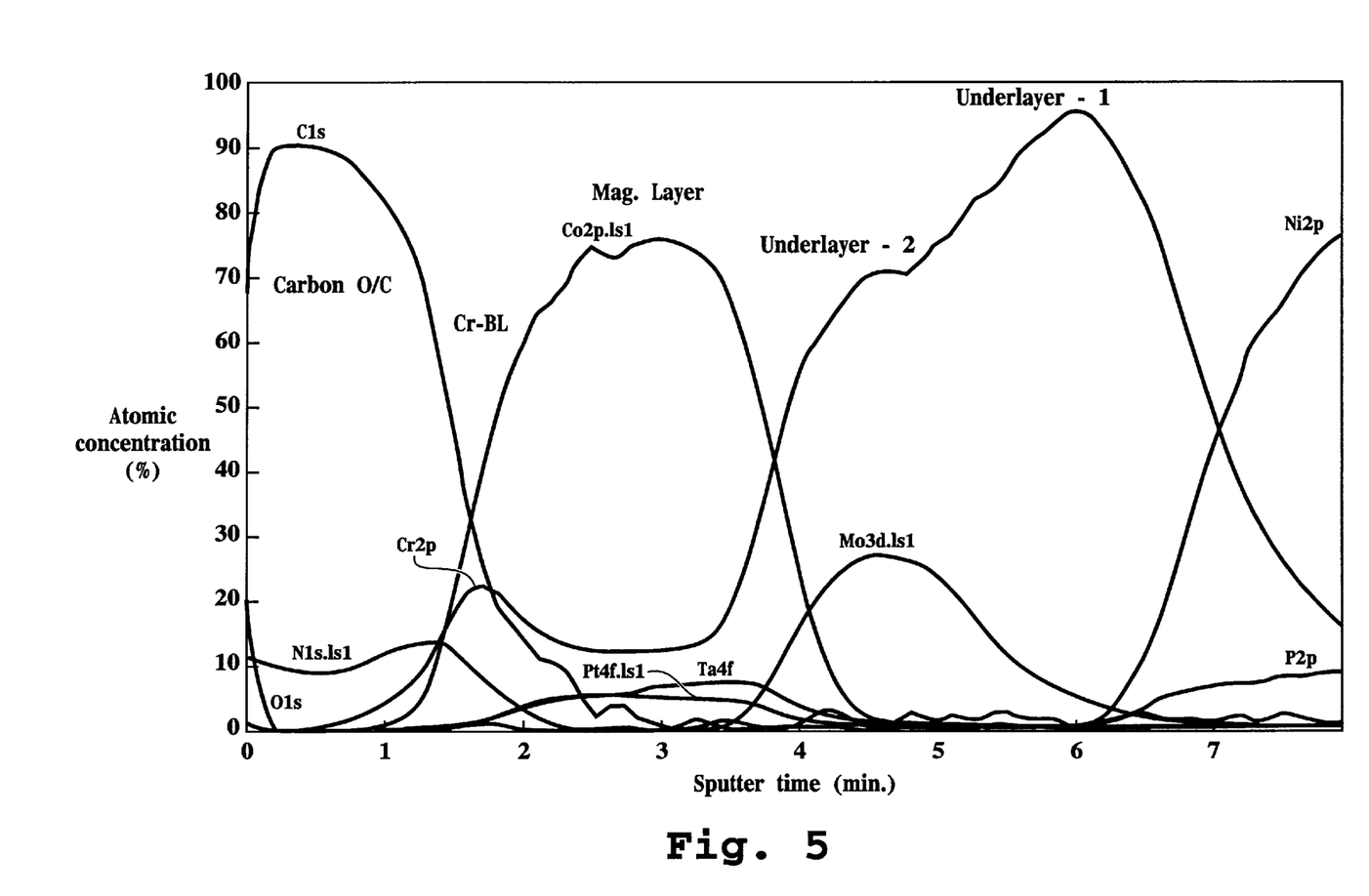
FIG. 5 is an X-ray photoelectron spectroscopy (XPS) profile of a magnetic recording medium having a chromium barrier deposited under an argon-nitrogen atmosphere where the atomic concentration, in percent, is shown versus etching time.

FIG. 5 is an X-ray photoelectron spectrum of a medium prepared in accordance with the invention. The spectrum was determined using an XPS/AES Physical Electronics (Model 5802) instrument at an escape angle of 45° and argon as a sputter etch gas. The etch rate was 55–65 Å/sec for carbon and 95–105 Å/sec for the metal layers. In the spectrum, the profile of the medium as a function of "depth" related to the sputter etching of the surface is shown; the x-axis corresponding to the composition of the media at a particular "depth" and the y-axis showing the relative intensity of the major elemental components at that "depth" . It is apparent from the profile that a Cr barrier layer is present between the C overcoat and the Co-based magnetic layer.

In another study performed in support of the invention, magnetic media having the following composition were prepared: a NiP/Al substrate; a first chromium underlayer having a thickness of 800 Å; a second underlayer, also 800 Å in thickness, of CrRu (90/10); a magnetic recording layer of CoCrTaPt (77/15/4/5) having a thickness of between 100–500 Å; a nitrogen-containing chromium barrier layer having a thickness of 18 Å; and a carbon overcoat. Comparative media were prepared similarly, except that the chromium barrier layer was deposited in a nitrogen-free sputtering atmosphere to obtain a barrier layer of substantially pure chromium.

The static magnetic properties as determined by vibrating sample magnetometry are shown in Table 3.

TABLE 3

| Cr Barrier Layer Thickness Å | Sputtering Atmosphere | Magnetic Properties | | | |
|---|---|---|---|---|---|
| | | Hc (Oe) | Mrt (memu/ cm²) | SR | S* |
| 18 | Ar + N$_2$ | 2530 | 0.68 | 0.85 | 0.85 |
| 18 | Ar | 2537 | 0.65 | 0.85 | 0.82 |

The magnetic medium formed in accordance with the invention has an improved magnetic remanence thickness product (Mrt).

Table 4 compares the parametric magnetic recording properties for the media of Table 3. As seen, there are improvements in high frequency and low frequency amplitude, as well as resolution.

TABLE 4

| Cr Barrier Layer Thickness Å | Sputtering Atmosphere | Hc (Oe) | Mrt (memu/ cm²) | Media Parametrics (ID = 0.83"; HF = 46.4 MHZ) | | | | |
|---|---|---|---|---|---|---|---|---|
| | | | | HF (µV) | LF (µV) | Res. (%) | OW (dB) | PW-50 (ns) |
| 18 | Ar + N$_2$ | 2530 | 0.68 | 371 | 1237 | 30.0 | 35.2 | 21.84 |
| 18 | Ar | 2537 | 0.65 | 324 | 1169 | 27.7 | 35.2 | 22.44 |

Figure 6:
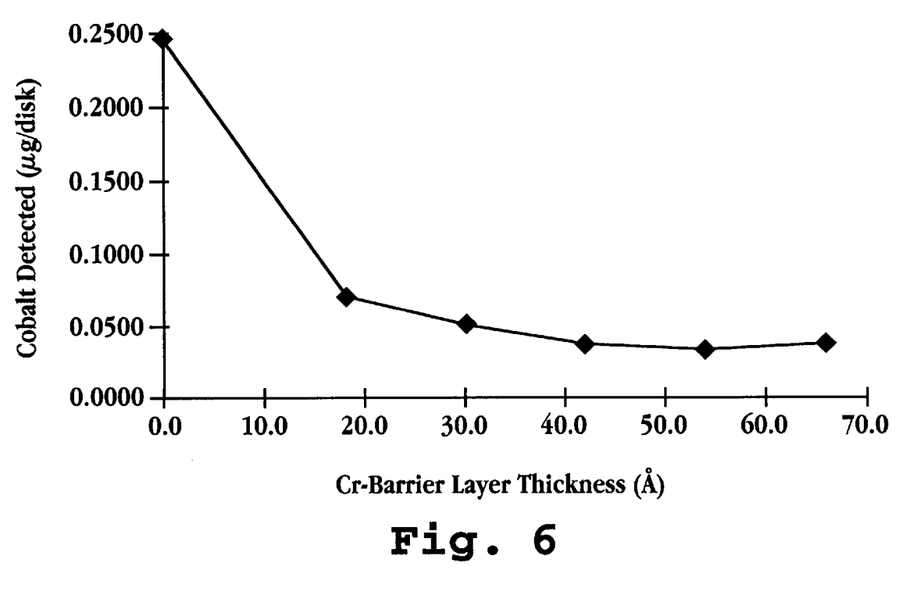
FIG. 6 shows the amount of cobalt detected by inductive coupled plasma, in $\mu g$/disk, as a function of thickness of the chromium barrier layer, in Å.

Magnetic media prepared in accordance with the invention to have a nitrogen-containing chromium barrier layer were analyzed by inductive coupled plasma (ICP) to determine the amount of cobalt present in the chromium barrier layer on the surface of the disc. Inductive coupling plasma spectroscopy is an emission spectroscopy technique for chemical analysis in which the elements that are to be measured are introduced into a high temperature (6,000–8, 000° C.) argon plasma, and converted into atomic vapor. Emission spectroscopy is used to identify and quantify the elements. The ICP data is presented in Table 5 and shown graphically in FIG. 6.

TABLE 5

| Sputtering Time for Deposition of Nitrogen-Containing Cr Barrier Layer (sec) | Cr Thickness (Å) | Cobalt* (µg/disk) |
|---|---|---|
| 0 | 0 | 0.2469 |
| 1.5 | 18 | 0.0689 |
| 2.5 | 30 | 0.0490 |
| 3.5 | 42 | 0.0337 |
| 4.5 | 54 | 0.0295 |
| 5.5 | 66 | 0.0329 |

TABLE 5-continued

| Sputtering Time for Deposition of Nitrogen-Containing Cr Barrier Layer (sec) | Cr Thickness (Å) | Cobalt* (μg/disk) |
| --- | --- | --- |

*average of three samples

As seen in the table, a medium having no nitrogen-containing barrier layer had 0.2469 μg cobalt present on the outer-most surface of the disc. As the thickness of the barrier layer increases the amount of cobalt detected in the barrier layer decreases, and a medium having a barrier thickness layer of 30 Å had 0.049 μg cobalt. It is also apparent from the data, and especially when viewed graphically as in FIG. 6, that the nitrogen-containing barrier layer in a thickness range of between about 10–50 Å, more preferably between 15–40 Å, is effective to minimize migration of cobalt.

Figure 7A:
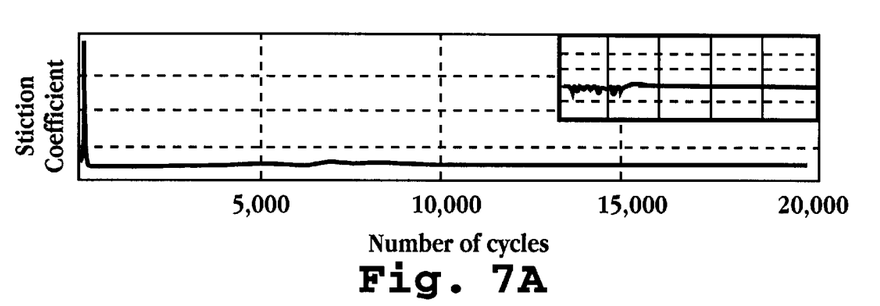
FIGS. 7A–7B are contact-start-stop stiction traces for the media prepared in accordance with the invention, where the in-situ stiction/friction tests were conducted under hot/dry conditions (55° C., 10% relative humidity, FIG. 7A) and under hot/wet conditions (30° C., 80% relative humidity, FIG. 7B)
Figure 7B:
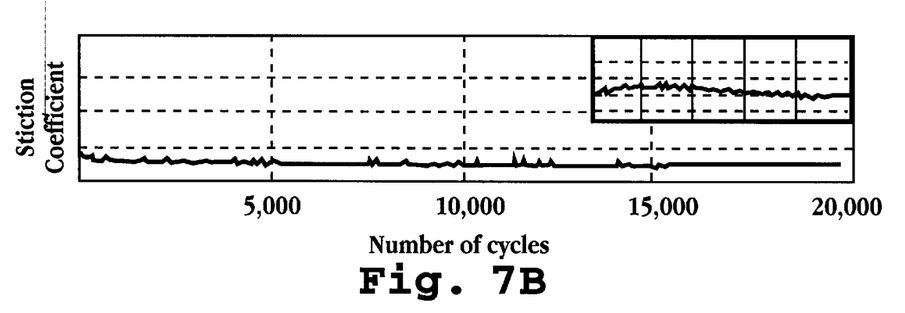

FIGS. 7A–7B are contact-start-stop stiction traces for the media prepared in accordance with the invention. The lubricity properties of a magnetic discs are generally measured in terms of dynamic and/or static coefficients of friction. Dynamic friction coefficients are typically measured using a standard drag test in which the drag produced by contact of a read/write head with a disc is determined at a constant spin rate, e.g., 1 rpm. Static coefficients of friction (stiction values) are typically measured using a standard contact-start-stop test in which the peak level of friction is measured as the disc starts rotating from zero to a selected revolution rate (e.g. to 5,000 rpm). After peak friction has been measured, the disc is brought to rest, and the start-stop process is repeated for a selected number of start-stop cycles. It is desirable that discs retain a low coefficient of friction after many start-stop cycles or contacts with a read/write head for long-term disc and drive performance.

The static coefficients of friction were measured for media prepared in accordance with the invention under hot/dry conditions of 55° C. and 10% relative humidity and under hot/wet conditions of 30° C. and 80% relative humidity. The results are shown in FIGS. 7A and 7B, respectively. As seen in the figures, the media of the invention having a nitrogen-containing barrier layer have excellent stiction/friction coefficients over the 20,000 cycles tested.

From the foregoing, it can be appreciated how various features and objects of the invention are met. The nitrogen-containing barrier layer in a thickness range between 10–50 Å is effective to prevent migration of cobalt from the magnetic layer; e.g. the barrier layer improves stability of the medium by reducing corrosion of the magnetic layer. Importantly, the presence of nitrogen in the barrier layer improves the effectiveness of the layer to reduce corrosion, thereby allowing for a much thinner layer to achieve the improved stability. The thinner layer, in turn, allows for enhanced magnetic properties by reducing spacing loss. The improved magnetic properties include a 10% increase in the signal amplitude of the medium along with improvements in other properties, as discussed above.

Although the invention has been described with respect to particular embodiments, it will be apparent to those skilled in the art that various changes and modifications can be made without departing from the invention.

It is claimed:

1. A magnetic recording medium, comprising
   a nonmagnetic, disc substrate,
   an underlayer formed on the substrate,
   a magnetic recording layer formed on the underlayer, and
   a barrier layer deposited on said magnetic recording layer by sputter deposition in a nitrogen-containing atmosphere, said barrier layer being composed of chromium or a chromium-based alloy and having a thickness of between 10–50 Å.

2. The medium of claim 1, wherein the barrier layer has a thickness of between 15–40 Å.

3. The medium of claim 2, wherein the barrier layer is composed of chromium.

4. The medium of claim 2, wherein the barrier layer is composed of a chromium-based alloy.

5. The medium of claim 1, wherein the barrier layer is sputtered in an atmosphere containing between 5–50% nitrogen, balance argon.

6. The medium of claim 1, wherein the underlayer is composed of a first underlayer and a second underlayer, the first underlayer composed of chromium and the second underlayer composed of a chromium-based alloy.

7. The medium of claim 5, wherein the chromium-based alloy is selected from CrRu and CrMo.

8. The medium of claim 1, wherein the magnetic layer is composed of a cobalt-based alloy.

9. The medium of claim 8, wherein the alloy is composed of cobalt, chromium, platinum and tantalum.

10. The medium of claim 1, which further includes a protective overcoat.

11. An improvement in a magnetic recording medium formed on a disc substrate and having an underlayer, a magnetic recording layer and a chromium barrier layer deposited directly on the magnetic recording layer, the improvement comprising,
    a chromium or chromium-based alloy barrier layer containing nitrogen and having a thickness of between 10–50 Å.

12. The medium of claim 11, wherein the barrier layer has a thickness of between 15–40 Å.

13. The medium of claim 12, wherein the barrier layer is composed of chromium.

14. The medium of claim 12, wherein the barrier layer is composed of a chromium-based alloy.

15. The medium of claim 11, wherein nitrogen is included in the barrier layer by sputter deposition of the layer in an atmosphere containing between 5–50% nitrogen, balance argon.

16. A method of preparing a magnetic recording medium formed on a substrate and having an underlayer and a magnetic recording layer, comprising,
    depositing by sputter deposition in a nitrogen-containing sputtering atmosphere, a barrier layer directly on the magnetic recording layer, said layer being composed of chromium or a chromium-based alloy and having a thickness of between 10–50 Å.

17. The method of claim 16, where said depositing is performed in an atmosphere containing between 5–50% nitrogen, balance argon.

18. The method of claim 16, wherein said barrier layer has a thickness of between 15–40 Å.

* * * * *